March 12, 1940.  T. G. MYERS ET AL  2,193,463
SUBMERSIBLE ELECTRIC MOTOR
Original Filed Feb. 27, 1932
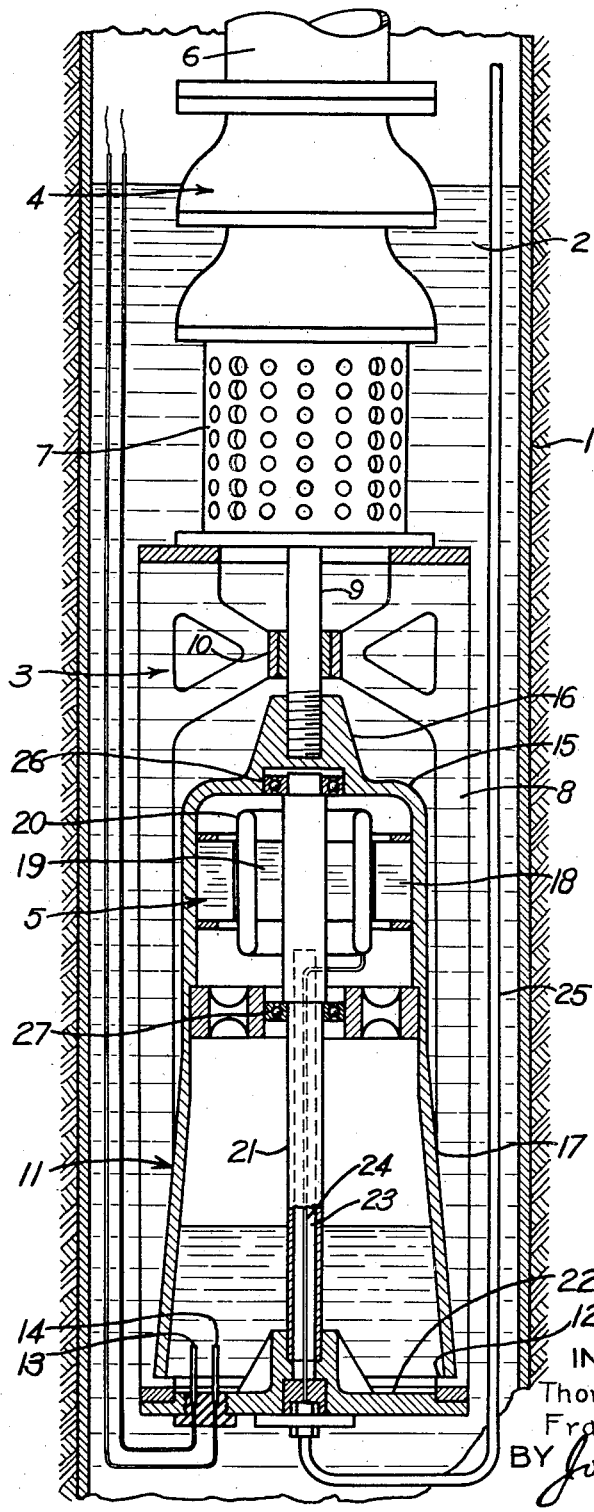
INVENTORS
Thomas G. Myers
Frank Mason
BY John Flam
ATTORNEY Patented Mar. 12, 1940

2,193,463

UNITED STATES PATENT OFFICE 2,193,463

SUBMERSIBLE ELECTRIC MOTOR

Thomas G. Myers, Los Angeles, Calif., and Frank Mason, Chicago, Ill., assignors to U. S. Electrical Motors, Inc., a corporation of California Original application February 27, 1932, Serial No. 595,590. Divided and this application August 23, 1937, Serial No. 160,480

8 Claims. (Cl. 172—36)

This invention relates to electric motors, and especially to submersible motors for operating deep well pumping units.

This application is a division of an application filed in the names of Thomas G. Myers and Frank Mason, for Submersible pump motor, February 27, 1932, Serial No. 595,590.

It is common to pump liquid from a deep well, such as an oil well or a water well, by submerging a pumping unit, comprising a pump and an electric motor, in the well. To prevent ingress of the liquid being pumped to the motor casing with resultant injury to the motor windings or other parts, the casing must be carefully sealed. Since the unit may be operated at a depth of several hundred feet or more, the pressure of the well fluid is high, and the casing is accordingly subjected to a large stress, with a probability that the fluid will be forced into the motor parts.

It is a principal object of this invention to obviate the necessity of any packing or sealing of the motor casing and yet to prevent the entry of well liquid into the motor parts.

This object is accomplished by supporting the motor in the top of a structure, the bottom only of which is open. When such a structure is submerged, air is trapped therein by the surrounding liquid, and is compressed as the level of the liquid within the structure rises. This serves to keep the liquid from reaching the motor. By making the structure sufficiently long, the volume of the trapped air will be great enough to permit the lowering of the structure to a considerable depth without the liquid reaching the motor.

Alternatively, means may be provided to furnish gas to the motor space in the structure for the purpose of creating a pressure within it to balance the pressure of the well fluid. This may be to supplement the volume of trapped air, thereby reducing the required length of the structure, or it may be merely to make up for air that is lost from any cause.

Another object of this invention is to provide a novel form of electric motor incorporating the open ended casing and having a greatly simplified construction.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing, the single figure is a diagrammatic view of a submerged pumping unit, in operative position in a well, the motor being shown in longitudinal section.

In the drawing, there is shown by way of example, a well casing 1 from which a liquid 2 usually water, or a mixture of water and other substances is to be pumped. Suspended in this liquid is a pumping unit 3 which includes a pump 4 and an electric motor 5. The pump may be of the centrifugal type and is secured to the lower end of the discharge pipe 6. A perforated cylindrical member 7 forming an intake is secured to the lower end of the pump, and to this member in turn is secured a frame 8 which serves to support the motor. The pump shaft 9 extends downwardly a short distance below the pump and a radial bearing 10 is provided in frame 8 to receive it. Attached to the lower end of the shaft, as by screw threads, is the structure 11 which is open at its lower end as indicated by 12. This structure forms the motor casing and has the motor 5 positioned in its upper end. As it is closed at its upper end, air will be trapped and compressed in it when it is lowered into the well liquid. Obviously, as the structure is lowered deeper into the liquid, the trapped air will be further compressed, and if the length of the structure has been properly proportioned with regard to the depth to which it is lowered, the surface of the liquid will be maintained below the motor.

Means for supplementing the trapped air, either to compensate for an insufficient initial volume due to the length of structure 11 not being great enough or to make up for air that is lost, may be provided. A convenient way of doing this is by decomposing the well liquid within the structure to form gas. Thus, electrodes 13 and 14 may be supported on frame 8 in the open end 12 of the structure, the passage of electricity between them serving to break down the liquid and form gas in a manner well understood.

The structure 11 which serves as a casing for the motor comprises a tubular member, or bell, which is closed at its upper end by a wall 15 having a central hub 16 in which the shaft 9 is secured. The depending wall or skirt 17 of the bell may be flared or tapered outwardly toward its lower end, and the bottom is entirely open at 12, as previously mentioned. Since the casing 11 is rigidly attached to the load driving shaft 9, it obviously must rotate. To impart rotation to it, the secondary member 18 or rotor is outside the primary or stator 19 which is fixed and carries the primary winding 20. The stator 19 is supported on a central shaft or column 21, which is rigidly secured to a plate 22 spanning the bottom of frame 8. Column 21 has a bore 23 or hollow part through which conductors 24 lead to the winding 20. A conduit 25 is sealed into plate 22 and serves to carry these conductors to the top of the well. Roller bearings 26 and 27 are secured to shaft 21 above and below the motor and serve to rotatably support casing 11 coaxially with respect to the shaft.

Since the casing 11 is entirely closed at the top, air will be trapped and compressed therein, serving to check the rise of well liquid inside the casing due to the pressure of the liquid outside the casing. Due to the large bottom opening 12, the pressures inside and outside equalize at once, and any change in the external pressure, as when the pumping unit is being raised or lowered in the well, produces immediately a corresponding change in the internal pressure. Thus casing 11 is never subjected to any pressure differential. The flare of skirt 17 is effective to prevent any undue rise of the liquid in the casing due to centrifugal force, as the casing rotates.

What is claimed is:

1. In a submersible structure, a driven shaft and a rotatable housing fastened to said shaft, said housing being sealed at its upper end and unsealed at its lower end, an electric motor in the housing and near its top, the rotating part of the motor being fastened to the housing to cause it to rotate.

2. In a submersible structure, a driven shaft and a rotatable housing fastened to said shaft, said housing being sealed at its upper end and unsealed at its lower end, an electric motor in the housing and near its top, the rotating part of the motor being fastened to the housing to cause it to rotate, and a support for the stationary part of the motor, said support extending into the housing from the lower end thereof.

3. The combination as set forth in claim 1, in which the housing is outwardly flared toward the bottom.

4. In a submersible structure, a driven shaft and a rotatable housing fastened to said shaft, said housing being sealed at its upper end and unsealed at its lower end, an electric motor in the housing and near its top, the rotating part of the motor being fastened to the housing to cause it to rotate, a support for the stationary part of the motor, said support extending into the housing from the lower end thereof, and also serving to rotatably support the rotatable housing.

5. An electric motor adapted for use with a submersible structure, comprising: a stator, a winding on said stator, a stationary shaft for supporting said stator, there being an axial bore extending at least part way through said shaft, means for supporting said shaft at its lower end in a substantially vertical position, a rotor, a rotatable housing enclosing said motor and supporting said rotor, said housing being sealed at its upper end and open at its lower end, bearing means on the shaft to rotatably support the housing, a driven shaft connected to the housing and adapted to be connected to a load, and electric current carrying means leading outwardly from the stator winding through the bore in the stationary shaft.

6. In a submersible structure, a support, a shaft secured to said support and extending upwardly therefrom a housing rotatably supported on said shaft, said housing being sealed at its upper end and open at its lower end, an electric motor in the housing near its top, the rotating part of the motor being fastened to the housing to cause it to rotate, the stationary part of the motor being mounted on said shaft, and a load driving shaft fastened to said housing.

7. In a submersible structure, an electric motor having a stationary member and a rotating member, means forming a rotatable housing for said motor and adapted to be rotated by said rotating member, there being an opening in said housing only at the bottom, said housing having a lower edge extending for a considerable distance below the motor and a load driving shaft connected to the housing.

8. In a submersible structure, an electric motor having a stationary member and a rotating member, means forming a rotatable housing for the motor and adapted to be rotated by said rotating member, said housing being open only at the bottom, a supporting member extending upwardly within the housing, bearing means on said member to support said housing, the walls of said housing being of sufficient length and extending for a considerable distance below the motor, to keep well fluid out of the lowest of said bearing means when the structure is submerged, by virtue of the trapped gas at the top of the housing, and a load driving shaft connected to said housing.

THOMAS G. MYERS.
FRANK MASON.